2,964,531
ACID PASTING PHTHALOCYANINES

Ben H. Kirby and Donald P. Bernard, Pittsburgh, Pa., and Joseph S. Milazzo, Bronx, N.Y., assignors, by mesne assignments, to Pittsburgh Chemical Company, Pittsburgh, Pa., a corporation of Pennsylvania No Drawing. Filed Nov. 6, 1956, Ser. No. 620,594

9 Claims. (Cl. 260—314.5)

This invention relates to a process for conditioning phthalocyanine pigments, and more particularly to an acid pasting procedure which produces phthalocyanine pigments having improved properties.

It is conventional today to condition phthalocyanine pigments by a process known as acid pasting. Such a process involves solution of the pigment in concentrated sulfuric acid or chlorosulfonic acid or the like followed by precipitation of the pigment by drowning the acid solution in water. When this procedure is followed by suitable after treatments, products are obtained which can be used in one or more of the following fields: paints, varnishes, lacquers, vinyl sheetings, textile printing, as dispersed pastes, powders or in flushing operations.

It is also known that acid milling using the shear action of a Werner-Pfleiderer mill or similar apparatus will give products suitable for some of the above uses.

When the temperature of the melt, either in acid pasting or acid milling, is increased to within the range of 45–100° C., there is an excellent improvement in the products obtained. However, there is a tendency for the products to change shade over a period of time, e.g., over 2 hours' contact time, so that the reaction is difficult to control in practice.

Accordingly, it is an object of the present invention to devise a method for protecting phthalocyanine pigments so that they can be treated for longer periods of time at elevated temperatures.

An additional object is to prepare phthalocyanine pigments having better grit properties, much stronger masstone and cleaner and brighter shades.

A further object is to obtain such improved phthalocyanines while eliminating the costly after treatment steps.

Yet another object is to prepare phthalocyanine pigments in which the shade of the pigment can be controlled by the concentration of the sulfuric acid in the acid pasting or acid milling steps.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by acid pasting or acid milling a phthalocyanine pigment at a temperature of between 45 and 100° C. in the presence of an arylene dicarboxylic acid or anhydride thereof or an alkane dicarboxylic acid or anhydride thereof or a cycloalkane dicarboxylic acid or anhydride thereof.

As examples of suitable dicarboxylic acids and anhydrides, there can be used phthalic acid, phthalic anhydride, isophthalic acid, terephthalic acid, homophthalic acid, diphenic acid, diphenic anhydride, o-phenylenediacetic acid, m-phenylenediacetic acid, p-phenylenediacetic acid, oxalic acid, malonic acid, succinic acid, succinic anhydride, glutaric acid, glutaric anhydride, adipic acid, pimelic acid, suberic acid, azelaic acid, sebacic acid and cyclohexane 1,2-dicarboxylic acid.

The preferred material is phthalic anhydride.

As the phthalocyanine, there can be used copper phthalocyanine, chlorophthalocyanines, such as octachloro copper phthalocyanine, dodecachloro copper phthalocyanine, hexadecachloro copper phthalocyanine, aluminum phthalocyanine, hexadecachloro aluminum phthalocyanine, etc. The preferred phthalocyanines are copper phthalocyanine and hexadecachloro copper phthalocyanine.

The dicarboxylic acid or anhydride is used in an amount of 2 to 30%, preferably 2 to 10% of the weight of the phthalocyanine and can be introduced either into the acid melt or premixed with the phthalocyanine prior to its introduction into the acid melt.

While temperatures between 45 and 100° C. can be employed, the preferred temperature range is 60–85° C.

The acid pasting or milling is carried out for a time ranging between 1 and 8 hours, preferably 2 to 5 hours. The preferred acid is sulfuric acid which can be used in a concentration of 90 to 100%. The shade of color of the phthalocyanine is dependent to some extent on the concentration of the sulfuric acid. For example, a yellower product of hexadecachloro copper phthalocyanine is obtained by working at high sulfuric acid concentrations and a bluer product is obtained by operating at lower sulfuric acid concentrations.

The sulfuric acid is normally used in an amount of 3 to 20 parts per part of phthalocyanine.

The process of the present invention results in obtaining phthalocyanine pigments having much better grit properties, much stronger masstone and cleaner and brighter shades than have previously been attained. When used for textile printing, either in an oil-in-water or a water-in-oil system, greater strength is obtained. Without the use of further after treatment, other than conventional drowning and filtering, there is thus obtained a product which gives better all around performance than is obtained using conventional processes.

The exact function of the dicarboxylic acids and anhydrides in the present process is not understood, although it appears that they protect the pigment from side effects caused by using strong sulfuric acid at high temperatures. Thus, it is possible to run for longer periods of time at higher temperature in order to get better dispersion and strong masstone.

Working at elevated temperatures, as in the present process, evidently reduces the particle size, since the grit determined by conventional grit gauge and microscopic determination is much less than for products obtained by conventional procedures. This is also evidenced by the superior performance of the products made by the present process in textile printing and the stronger masstone and cleaner shade for other uses such as in paint, printing ink and plastics.

Unless otherwise stated, all parts and percentages are by weight.

Example 1

Into a flask equipped with an agitator and thermometer there were charged 300 parts of sulfuric acid (95–96%) and over a period of about 30 minutes there were charged a premix of 3 parts phthalic anhydride and 30 parts of hexadecachloro copper phthalocyanine. The mixture was heated in one hour to 60° C. and held at this temperature for three hours. The reaction mixture was slowly drowned into 2000 parts of water, steamed for one hour at 100° C., filtered and washed neutral.

The filtercake obtained, as is, was excellent in shade and masstone and had a very low grit content after flushing into appropriate media, e.g., an alkyd resin, or linseed oil, etc. It also gave excellent strength in use as a pigment for textile printing both in the water-in-oil and oil-in-water systems.

*Example 2*

Similar results were obtained when the mixture of phthalic anhydride and the chloro copper phthalocyanine were charged over one hour rather than over a period of 30 minutes.

*Example 3*

Example 1 was repeated but the heating was at 85° C. rather than 60° C. The results obtained were substantially the same as those in Example 1.

The above examples illustrate the acid pasting procedure.

*Example 4*

Into a small Werner-Pfleiderer were charged 3.5 parts of sulfuric acid (95–96%) and enough premix of 30 parts hexadecachloro copper phthalocyanine and 3 parts of phthalic anhydride to give a thick mass. Further amounts of sulfuric acid and premix were charged until a total of 99 parts of sulfuric acid and all of the premix had been added. The mass was then heated to 60° with constant agitation and held at this temperature for three hours.

The whole mass was drowned in 1000 parts of water, steamed at 100° C. for one hour, filtered, and washed neutral.

This product, after conventional flushing, had a much stronger masstone, cleaner shade and much less grit than the product prepared without the use of phthalic anhydride or prepared at lower temperature. The product also gave greater strength and cleaner, brighter shades when used in textile printing applications than conventionally prepared pigments.

*Example 5*

Example 4 was repeated but the heating was at 85° C. rather than at 60° C. The results obtained were substantially the same as those in Example 4.

*Example 6*

The procedure of Example 4 was repeated, except that the sulfuric acid concentration was reduced to 96–98%. The product obtained had a yellower shade, but was equal in its other properties to the material obtained in Example 4.

*Example 7*

The procedure of Example 4 was repeated, except that the sulfuric acid concentration was reduced to 93–95%. In this case, the product obtained was bluer in shade but equal in its other properties to the material obtained in Example 4.

We claim:

1. In a process of acid milling a phthalocyanine pigment with forces predominantly shearing in nature, the improvement comprising carrying out the acid milling in the presence of 2 to 30% of an organic compound selected from the group consisting of hydrocarbon dicarboxylic acids and the anhydrides thereof based on the weight of said pigment and at a temperature of treatment between about 45 and 100° C.

2. A process according to claim 1 wherein the organic compound is phthalic anhydride.

3. In a process of acid milling with sulfuric acid a phthalocyanine pigment selected from the group consisting of copper phthalocyanine and chloro copper phthalocyanine with forces predominantly shearing in nature, the improvement comprising carrying out the treatment in the presence of 2 to 30% of an organic compound selected from the group consisting of hydrocarbon dicarboxylic acids and the anhydrides thereof based on the weight of said pigment and at a temperature of treatment between about 45 and 100° C.

4. A process according to claim 3 wherein the organic compound is phthalic anhydride.

5. A process according to claim 4 wherein the temperature is between about 60 and 85° C.

6. A process according to claim 5 wherein the phthalocyanine is copper phthalocyanine.

7. A process according to claim 5 wherein the phthalocyanine is hexadecachloro copper phthalocyanine.

8. A process according to claim 3 wherein the organic compound is present in an amount of about 2 to 10% of the phthalocyanine.

9. A process according to claim 8 wherein the organic compound is phthalic anhydride.

References Cited in the file of this patent

UNITED STATES PATENTS

| | | |
|---|---|---|
| 2,195,984 | Dent et al. | Apr. 2, 1940 |
| 2,602,800 | Barnhart | July 8, 1952 |
| 2,805,957 | Ehrich | Sept. 10, 1957 |